United States Patent
Inam et al.

(10) Patent No.: US 10,756,542 B2
(45) Date of Patent: Aug. 25, 2020

(54) AGILE DEPLOYMENT OF OPTIMIZED POWER FLOW CONTROL SYSTEM ON THE GRID

(71) Applicant: Smart Wires Inc., Union City, CA (US)

(72) Inventors: Haroon Inam, San Jose, CA (US); Debrup Das, Union City, CA (US); Amrit Iyer, Oakland, CA (US); Kamil Bojanczyk, Santa Clara, CA (US)

(73) Assignee: Smart Wires Inc., Union City, CA (US)

( * ) Notice: Subject to any disclaimer, the term of this patent is extended or adjusted under 35 U.S.C. 154(b) by 164 days.

(21) Appl. No.: 16/104,778

(22) Filed: Aug. 17, 2018

(65) Prior Publication Data

US 2019/0237971 A1     Aug. 1, 2019

Related U.S. Application Data

(60) Provisional application No. 62/622,441, filed on Jan. 26, 2018.

(51) Int. Cl.
*H02J 3/18*     (2006.01)
*H02M 5/293*    (2006.01)
(Continued)

(52) U.S. Cl.
CPC ............. *H02J 3/18* (2013.01); *H02J 3/1807* (2013.01); *H02J 3/1814* (2013.01); *H02J 3/20* (2013.01);
(Continued)

(58) Field of Classification Search
CPC .......... H02J 3/18; H02J 3/1807; H02J 3/1814; H02J 3/20; H02M 5/293; H02M 2007/4835
See application file for complete search history.

(56) References Cited

U.S. PATENT DOCUMENTS 3,955,657 A   5/1976   Bossi
3,959,985 A   6/1976   Schulze, Sr.
(Continued)

FOREIGN PATENT DOCUMENTS

WO     2005/067117     7/2005

OTHER PUBLICATIONS

"International Search Report and Written Opinion of the International Searching Authority dated Aug. 14, 2018; International Application No. PCT/US2018/034476", Aug. 14, 2018.
(Continued)

*Primary Examiner* — Robert L Deberadinis
(74) *Attorney, Agent, or Firm* — Womble Bond Dickinson (US) LLP (57) ABSTRACT

A modular power flow control system is described for optimizing power flow control in a multi-phase power transmission system. Identical impedance injection modules are arranged in an m×n matrix, where m is the number of series-connected modules inserted into each phase (forming a leg of the installed bank of modules), and n is the number of parallel-connected legs per phase. Each impedance injection module in a phase is configurable to collectively insert a pre-determined (controllable) power control waveform into the phase to which it is attached. The modular flow control system is agile with respect to configurability, reconfigurability, maintenance, size, weight, and cost.

33 Claims, 5 Drawing Sheets

(51) Int. Cl.
*H02J 3/20* (2006.01)
*H02M 7/483* (2007.01)
(52) U.S. Cl.
CPC .... *H02M 5/293* (2013.01); *H02M 2007/4835* (2013.01)

(56) References Cited

U.S. PATENT DOCUMENTS

| | | | |
|---|---|---|---|
| RE29,994 E | 5/1979 | Bossi | |
| 4,167,670 A | 9/1979 | Ingold | |
| 4,188,536 A | 2/1980 | DallaPiazza | |
| 4,293,902 A | 10/1981 | White | |
| 4,322,817 A | 3/1982 | Kuster | |
| 4,355,351 A | 10/1982 | Schwarz | |
| 4,683,461 A | 7/1987 | Torre | |
| 4,823,250 A | 4/1989 | Kolecki et al. | |
| 4,908,569 A | 3/1990 | Fest | |
| 5,149,277 A | 9/1992 | LeMaster | |
| 5,216,285 A | 6/1993 | Hilsenteger et al. | |
| 5,231,929 A | 8/1993 | Theurer et al. | |
| 5,270,913 A | 12/1993 | Limpaecher | |
| 5,340,326 A | 8/1994 | LeMaster | |
| 5,741,605 A | 4/1998 | Gillett et al. | |
| 5,875,235 A | 2/1999 | Mohajeri | |
| 5,892,351 A | 4/1999 | Faulk | |
| 5,917,779 A | 6/1999 | Ralson et al. | |
| 5,949,148 A | 9/1999 | Wagner | |
| 6,061,259 A | 5/2000 | DeMichele | |
| 6,075,349 A | 6/2000 | Okayama | |
| 6,134,105 A | 10/2000 | Lueker | |
| 6,198,257 B1 | 3/2001 | Belehradek et al. | |
| 6,296,065 B1 | 10/2001 | Carrier | |
| 6,340,851 B1 | 1/2002 | Rinaldi et al. | |
| 6,356,467 B1 | 3/2002 | Belehradek, Jr. | |
| 6,397,156 B1 | 5/2002 | Bachmann et al. | |
| 6,460,626 B2 | 10/2002 | Carrier | |
| 6,477,154 B1 | 11/2002 | Cheong et al. | |
| 6,489,694 B1 | 12/2002 | Chass | |
| 6,643,566 B1 | 11/2003 | Lehr et al. | |
| 6,675,912 B2 | 1/2004 | Carrier | |
| 6,909,943 B2 | 6/2005 | Lehr et al. | |
| 7,141,894 B2 | 11/2006 | Kraus | |
| 7,325,150 B2 | 1/2008 | Lehr et al. | |
| 7,440,300 B2 | 10/2008 | Konishi et al. | |
| 7,453,710 B2 | 11/2008 | Baurle et al. | |
| 7,466,819 B2 | 12/2008 | Lehr et al. | |
| 7,469,759 B2 | 12/2008 | Botzelmann | |
| 7,642,757 B2 | 1/2010 | Yoon et al. | |
| 7,729,147 B1 | 6/2010 | Wong et al. | |
| 8,019,484 B2 | 9/2011 | Korba et al. | |
| 8,189,351 B2 | 5/2012 | Chung et al. | |
| 8,210,418 B1 | 7/2012 | Landoll et al. | |
| 8,249,836 B2 | 8/2012 | Yoon et al. | |
| 8,395,916 B2 | 3/2013 | Harrison | |
| 8,434,657 B2 | 5/2013 | Landoll et al. | |
| 8,649,883 B2 | 2/2014 | Lu et al. | |
| 8,755,184 B2 | 6/2014 | Peng et al. | |
| 8,767,427 B2 | 7/2014 | Wallmeier | |
| 8,867,244 B2 | 10/2014 | Trainer et al. | |
| 9,065,345 B2 | 6/2015 | Rigbers et al. | |
| 9,130,458 B2 | 9/2015 | Crookes et al. | |
| 9,241,397 B2 | 1/2016 | Kaneko et al. | |
| 9,325,173 B2 | 4/2016 | Varma et al. | |
| 9,331,482 B2 | 5/2016 | Huang | |
| 9,332,602 B2 | 5/2016 | Roberts et al. | |
| 9,473,028 B1 | 10/2016 | Hoyt | |
| 9,590,424 B2 | 3/2017 | Grisenti et al. | |
| 9,659,114 B2 | 5/2017 | He et al. | |
| 9,735,702 B2 | 8/2017 | Hu et al. | |
| 9,847,626 B2 | 12/2017 | Mauri Lopez | |
| 10,141,724 B2 | 11/2018 | Jung et al. | |
| 2002/0057342 A1 | 5/2002 | Yoshiyama et al. | |
| 2004/0049321 A1 | 3/2004 | Lehr et al. | |
| 2004/0132497 A1 | 7/2004 | Weese | |
| 2005/0073200 A1 | 4/2005 | Divan et al. | |
| 2005/0160682 A1 | 7/2005 | Quadrio | |
| 2005/0169243 A1 | 8/2005 | Lehr et al. | |
| 2005/0169297 A1 | 8/2005 | Lehr et al. | |
| 2006/0127715 A1 | 6/2006 | Botzelmann | |
| 2007/0230094 A1 | 10/2007 | Carlson | |
| 2007/0250217 A1 | 10/2007 | Yoon et al. | |
| 2008/0103737 A1 | 5/2008 | Yoon et al. | |
| 2008/0177425 A1 | 7/2008 | Korba et al. | |
| 2008/0205088 A1 | 8/2008 | Chung et al. | |
| 2009/0173033 A1 | 7/2009 | Baxter, Jr. | |
| 2009/0202241 A1 | 8/2009 | Yu et al. | |
| 2010/0014322 A1 | 1/2010 | Harrison | |
| 2010/0094477 A1 | 4/2010 | Berggren et al. | |
| 2012/0024515 A1 | 2/2012 | Wei | |
| 2012/0085612 A1 | 4/2012 | Churchill | |
| 2012/0134107 A1 | 5/2012 | Peng et al. | |
| 2012/0205981 A1 | 8/2012 | Varma et al. | |
| 2012/0312862 A1 | 12/2012 | Landoll et al. | |
| 2013/0068271 A1 | 3/2013 | Bqoor | |
| 2013/0094264 A1 | 4/2013 | Crookes et al. | |
| 2013/0128636 A1 | 5/2013 | Trainer et al. | |
| 2013/0155662 A1 | 6/2013 | Goschl | |
| 2013/0169055 A1 | 7/2013 | Bats et al. | |
| 2013/0256613 A1 | 10/2013 | Hyde et al. | |
| 2013/0261821 A1 | 10/2013 | Lu et al. | |
| 2013/0346571 A1 | 12/2013 | Putseyeu et al. | |
| 2014/0129195 A1 | 5/2014 | He et al. | |
| 2014/0132229 A1 | 5/2014 | Huang | |
| 2014/0246914 A1 | 9/2014 | Chopra et al. | |
| 2014/0312859 A1 | 10/2014 | Ramsay et al. | |
| 2015/0108897 A1 | 4/2015 | Kaneko et al. | |
| 2015/0134137 A1 | 5/2015 | Perju et al. | |
| 2015/0219554 A1 | 8/2015 | Hedges et al. | |
| 2015/0236509 A1 | 8/2015 | Divan et al. | |
| 2015/0293517 A1 | 10/2015 | Higgins | |
| 2016/0036341 A1 | 2/2016 | Jang et al. | |
| 2016/0273211 A1 | 9/2016 | Brewer et al. | |
| 2016/0369689 A1 | 12/2016 | Brewer et al. | |
| 2017/0170660 A1 | 6/2017 | Hu et al. | |
| 2017/0237255 A1 | 8/2017 | Inam et al. | |
| 2018/0034280 A1 | 2/2018 | Pedersen | |
| 2018/0316163 A1 | 11/2018 | Jung | |
| 2019/0006835 A1 | 1/2019 | Inam et al. | |

OTHER PUBLICATIONS

Albasri, Fadhel A. et al., "Performance Comparison of Distance Protection Schemes for Shunt—FACTS Compensated Transmission Lines", IEEE Transactions on Power Delivery, vol. 22, No. 4, Oct. 2007, pp. 2116-2125.
Bhaskar, M. A. et al., "Impact of FACTS devices on distance protection in Transmission System", 2014 IEEE National Conference on Emerging Trends in New & Renewable Energy Sources and Energy Management (NCET NRES EM), Dec. 16, 2014, pp. 52-58.
Samantaray, S. R. , "A Data-Mining Model for Protection of FACTS-Based Transmission Line", IEEE Transactions on Power Delivery, vol. 28, No. 2, Apr. 2013, pp. 612-618.
"Office Action dated Sep. 12, 2019; U.S. Appl. No. 15/694,605", filed Sep. 12, 2019.
"Extended European Search Report dated Sep. 9, 2019; European Patent Application No. 19153095.5", dated Sep. 9, 2019.
"Notice of Allowance dated Apr. 4, 2019; U.S. Appl. No. 16/035,976", filed Apr. 10, 2019.
"Notice of Allowance dated Jan. 27, 2020; U.S. Appl. No. 15/694,605", filed Jan. 27, 2020.

AGILE DEPLOYMENT OF OPTIMIZED POWER FLOW CONTROL SYSTEM ON THE GRID

CROSS-REFERENCE TO RELATED APPLICATIONS

This application claims the benefit of U.S. Provisional Patent Application No. 62/622,441 filed Jan. 26, 2018, the entirety of which is incorporated herein by reference.

The disclosure of U.S. patent application Ser. No. 15/694,605 entitled "Modular FACTS Devices with External Fault Current Protection" is incorporated herein by reference.

BACKGROUND OF THE INVENTION

1. Field of the Invention

This invention relates to the field of single and multi-phase ac power flow control systems, and more particularly to agile systems and methods comprising identical impedance injection modules that can be reconfigured and redeployed.

2. Prior Art

Transformerless power flow control systems have been developed, having reduced size and weight compared with systems containing isolation transformers. Equipment deployed in transformerless power flow control systems is comprised of highly complex and customized installations, including procurement of components that require long planning cycles and modification of protection systems prior to installation. Accordingly, there is a need in the art for agile power flow control systems having identical and standardized impedance injection modules for quick and efficient configuration, deployment, reconfiguration and redeployment. Preferably these systems will offer deployment flexibility with respect to power flow control level and current capacity; also, installation with minimal disturbance to existing fault monitoring systems.

DETAILED DESCRIPTION OF THE PREFERRED EMBODIMENTS

Figure 1:
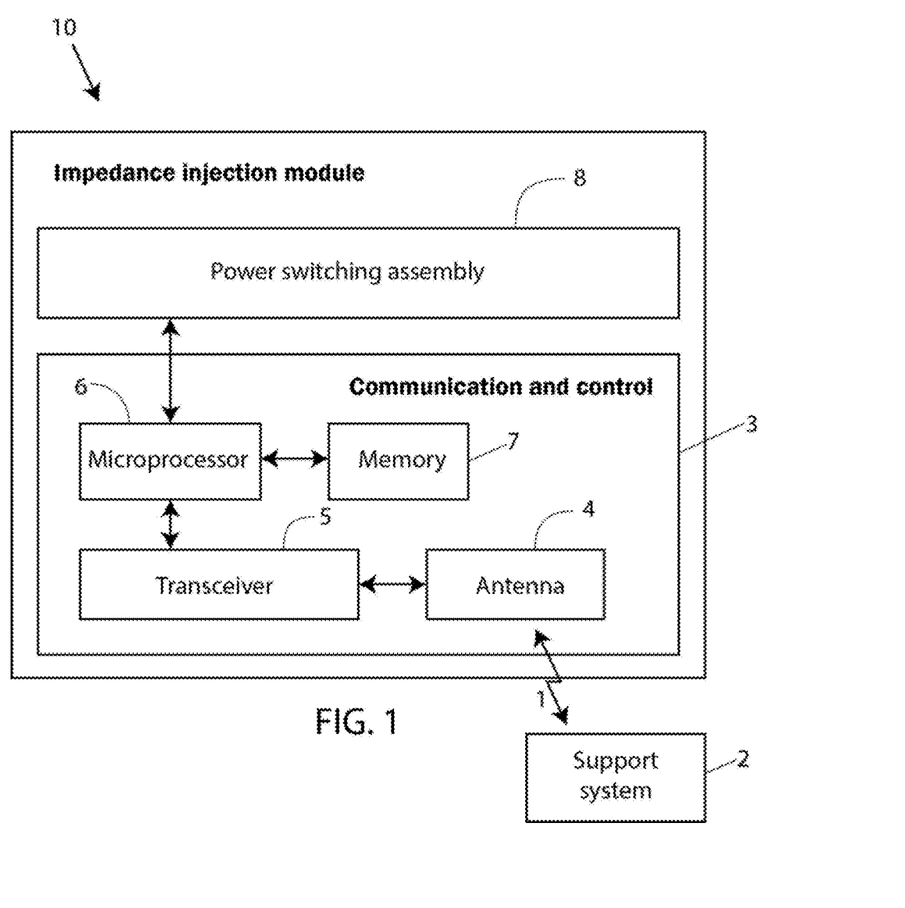
FIG. 1 is a block diagram of an impedance injection module of the present invention, including a wireless link to a support system.

FIG. 1 is a block diagram of an impedance injection module 10 having a wireless interface 1 to a support system 2, which provides configuration parameters to impedance injection module 10 in accordance with a system-level plan to optimize power flow in a transmission line of a high voltage power transmission system, as well as reconfiguration parameters as power flow characteristics vary with changing power source and load conditions and/or on redeployment of the impedance injection module. Such configuration and reconfiguration parameters may be provided wirelessly through the support system 2 of FIG. 1, thereby allowing the parameters to be as frequently updated as desired without physical access to the modules.

Impedance injection module 10 includes a communication and control block 3 which comprises an antenna 4 for receiving and transmitting wireless signals 1, a transceiver 5 coupled to antenna 4, and a microprocessor 6 coupled to the transceiver 5 and to a memory 7. Memory 7 contains instructions executable by microprocessor 6 for operating impedance injection module 10, including transmission of configuration parameters to power switching assembly 8, to be further described in reference to FIGS. 2-3. Memory 7 also includes a nonvolatile rewrite section that may be programed (data and/or instructions) by the support system 2 through transceiver 5 as software configuration programming to configure, and reconfigure as necessary, each of the individual impedance injection modules 10 as previously described. Thus, impedance injection module 10 may be configured or reconfigured and controlled as required, by a remote support system 2 as desired. Impedance injection module 10 may further include elements that are not shown, such as by way of example, a battery, heat dissipation elements, and discrete filter components.

For highly efficient power transfer, and specifically to support the ability to transmit reactive power over power transmission lines, each of the impedance injection modules is configurable to adjust line reactance while having a smaller effect on line resistance.

Figure 2:
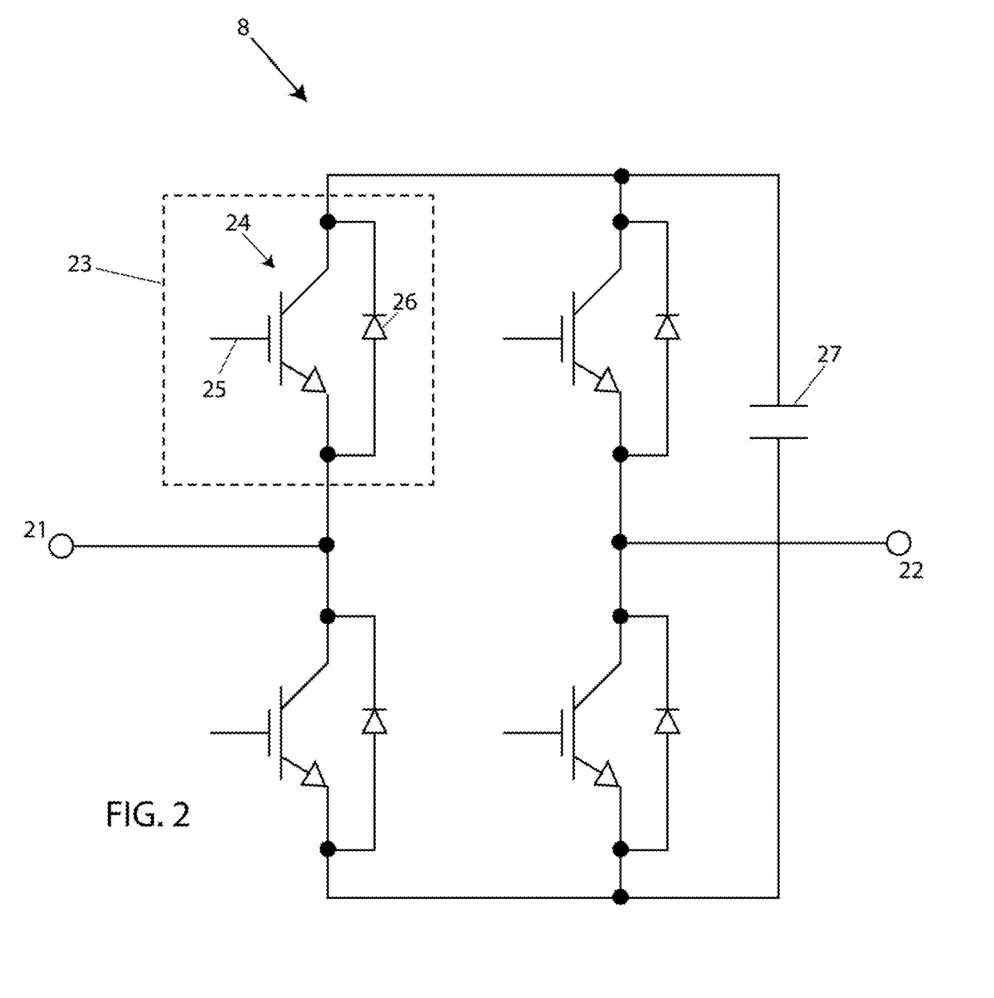
FIG. 2 is a schematic showing components of the power switching assembly of FIG. 1, arranged in a full bridge configuration.
Figure 3:
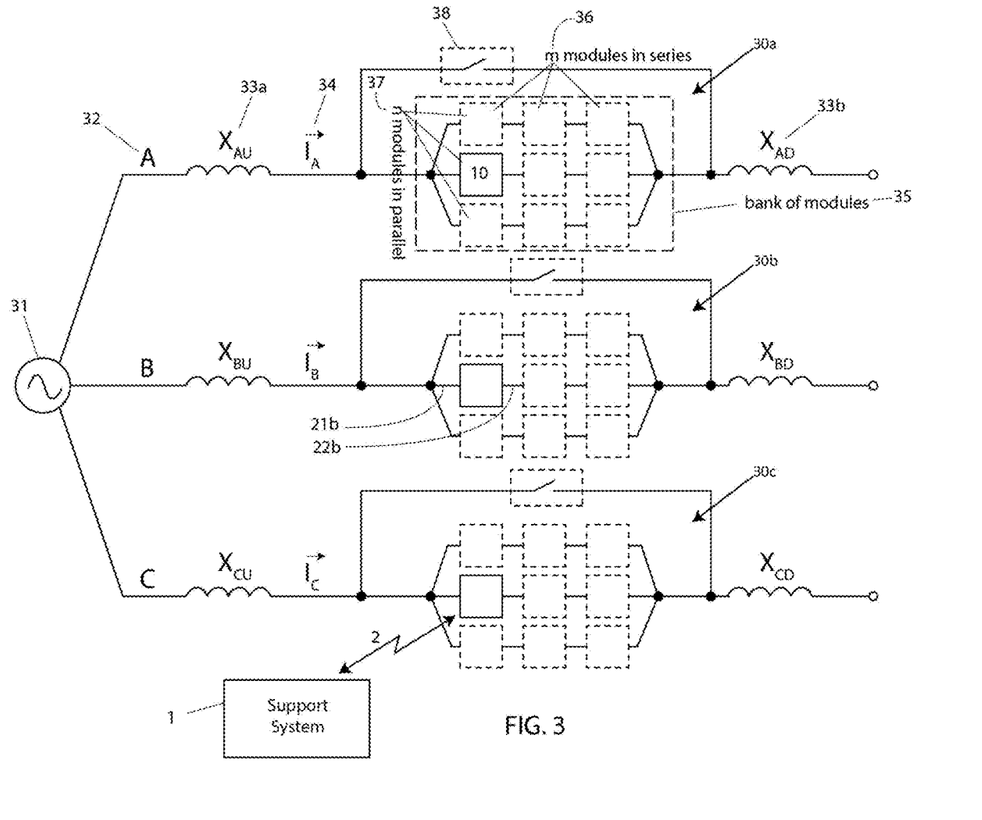
FIG. 3 illustrates three phases of a power transmission system, each phase including the installation of a bank of impedance injection modules, in accordance with an embodiment of the present invention.

FIG. 2 is a circuit schematic for power switching assembly 8, implemented as a full bridge in an exemplary embodiment of an impedance injection module of the present invention. Terminals 21 and 22 connect in series with the transmission line as shown in FIG. 3 as connections 21b and 22b for the B phase of the transmission lines. Device 23 includes a high-power switch 24 with a control input 25, the control value to be determined by the microprocessor 6 in each impedance injection module 10. Typically, the control input is a one bit digital value per power switching device 23 that is subsequently amplified to drive each power switching device 23 at their respective control inputs 25. By controlling the inputs to each of four control inputs such as 25, the desired instantaneous impedance is injected into the power line at terminals 21 and 22. In FIG. 2 the high-power switch 24 depicted is an insulated gate bipolar transistor (IGBT). However, a thyristor, a metal oxide semiconductor field effect transistors (MOSFET), a gate turn-off thyristor (GTO) or other power switching device may be used. The high-power switches 24 may employ silicon, silicon carbide, or gallium nitride semiconductors as non-limiting examples. Diodes 26 are body (or substrate) to drain diodes in each high-power switch 24 (FIG. 2) of each impedance injection module 10. A DC link capacitor 27, also shown, stores the DC voltage that is required to be injected. Note that using the full bridge implementation of power switching assembly 8, each full bridge 8 in each impedance injection module 10 can be activated to store on the link capacitor 27 a DC voltage of either polarity and inject the DC voltage stored on link capacitor 27 at the appropriate times and with the desired polarity within one cycle of the line current waveform. The DC voltage stored on link capacitor 27 can be instantaneously reduced as required by turning on a pair of the high-power switches 24 at the correct moment in a power cycle. In some embodiments, a half-bridge converter may be used in place of a full bridge. The impedance injection may be capacitive or inductive as needed or desired by appropriate control of switching devices 23 (FIG. 2).

FIG. 3 depicts a power flow control system 30a in an embodiment of the present invention. Power flow control system 30a may be described as a bank of transformerless static synchronous series converters (TL-SSSC), described herein as transformerless converters, each in the form of an impedance injection module 10 that injects a pre-determined (controllable) waveform onto a phase of a power transmission system wherein the waveform is synchronous with the line current, and wherein the transformerless converter comprises stationary (static, non-moving or non-rotating) equipment, and also comprises components connected in series with the line. Three phases labeled A, B, C are shown, representing three power transmission lines of a high voltage power transmission system forming a part of the grid and carrying electrical power from a three-phase power source 31, each phase carrying an identical power flow control system 30a, 30b, 30c. Power source 31 may be a substation for example, or some other power source, such as a mechanical power generator, a solar farm, etc.

Although many power flow control systems comprise three phases, the present invention may be described in reference to a generalized single or multi-phase system and can be used with any number of phases. Since the equipment installed in each phase is identical, only phase A 32 is described. Phase A includes $X_{AU}$ 33a, the upstream impedance of the transmission line, and carries an electric current $I_A$ 34, shown as a vector quantity having both magnitude and direction. $X_{AD}$ 33b is the downstream impedance of the transmission line. $I_A$ may be represented as a sine wave versus time, having an amplitude and an instantaneous phase angle. A bank 35 of impedance injection modules 10 is shown, configured as an m×n matrix of impedance injection modules, wherein each impedance injection module is capable of impressing a synthesized impedance to the current flowing on line A 32, $I_A$ 34. Each impedance injection module 10 impresses the synthesized impedance across terminals such as 21b and 22b in phase B of the figure, where terminals 21 and 22 are defined in reference to FIG. 2. Variables m 36 and n 37 are each an integer in a typical range of 1-2,000, allowing for application to power transmission systems across a broad range of operating voltages and currents, while improving the efficiency of power transmission through power flow control system 30a. "m" equals the number of impedance injection modules in series in a leg of the bank of impedance injection modules. "n" equals the number of parallel legs in the bank of impedance injection modules. Increasing the variable m provides for higher series voltage injection capability. Increasing n provides for higher transmission line operating currents while supporting high system reliability, by ensuring that current flowing in each power component does not exceed its recommended rating. The overall synthesized impedance provided by a bank of impedance injection modules 35 is calculated to provide a desired level of series voltage injection. Values of m and n greater than 2,000 may also be used. It is an object of the present invention that power flow control system 10a is agile with respect to configurability, reconfigurability, maintenance, size, weight, and cost.

For responding to potential faults in one or more impedance injection modules in a bank 35 of impedance injection modules, each bank 35 of impedance injection modules 10 may be augmented with a bypass switch 38, further described in cross-referenced patent application, Ser. No. 15/694,605. Alternatively, bypass switch 38 may be activated in response to a fault in a transmission line such as A, B, C, wherein the fault is external to the bank 35 of impedance injection modules 10.

Each impedance injection module 10 in each bank 35 of impedance injection modules 10 is identical, and this standardization leads to an agile power flow control system 30a, wherein the impedance injection modules 10 can be efficiently configured, reconfigured, and replaced if necessary. As used herein and in the claims to follow, "identical" as used with reference to identical impedance injection modules means of the same design and construction, though may incorporate parts supplied by more than one vendor. Obviously each identical impedance injection module will differ from the others in such ways as having a unique serial number and electronic identification, and normally will have programming that may differ from at least some other impedance injection modules in the same power flow control system. In that regard, the configuration and reconfiguration parameters may include parameters that include programming changes allowing the impedance injection modules to collectively be remotely coordinated to execute more than a single power flow control algorithm at different times.

Contributing to an agile power system having scalability along with minimum size, weight and cost, each of the plurality of impedance injection modules 10 is capable of providing an impedance injection level sufficient to optimize a reactive power transfer of at least 2 kVA per kilogram weight of the impedance injection module. Furthermore, in pursuit of a simplified yet capable power flow control system 30a, there are no shunt components connected between the phases: there is no requirement for shunt components, and shunt components are preferably omitted in all embodiments of the present invention. Also, in power flow control system 30a, when installed and in operation, the impedance injection modules 10 float with respect to ground and there is no requirement for a ground isolation transformer. In addition, the TL-SSSCs (transformerless converters) of the present invention do not require isolation from the transmission line voltage, even though the line voltage may be as high as 765 kV for example. Accordingly, transformers for either ground isolation or line voltage isolation are omitted in all embodiments of the present invention. In embodiments of the present invention, isolation from ground is achieved by spacing the line around 10 meters or more above ground, by shielding the impedance injection modules within metal enclosures, and by providing corona rings (curved annular surfaces) that limit the electric field emanating from an impedance injection module. This limited electric field is insufficient to create corona discharge.

It is an advantage of power flow control system 30a that it can be configured to avoid the creation of new sub-synchronous resonances arising from installation of the modular power flow control system; the power flow control system 30a can also be configured to lessen the severity of pre-existing sub-synchronous resonances. Sub-synchronous resonances occur at frequencies below the primary transmission frequency which is typically 60 Hz in the United States. Lessening the severity of pre-existing sub-synchronous resonances by the power flow control system 30a of the present invention can be achieved by simply tailoring the control of the impedance injections to also simultaneously add to the injections, waveforms counteracting the pre-existing sub-synchronous resonances with no change in the power control systems 30a themselves, thereby preserving the ability to use identical and standardized impedance injection modules.

The deployment and operation of an impedance injection module includes determining the values of m and n in the one or more banks of impedance injection modules to be deployed at a specified location. The value of m will depend on the line impedance and the total voltage injection desired. The value of n will be determined by the required current capacity of each phase, given the current capacity of the individual impedance injection modules 10. The advantage of splitting each phase into n legs and of placing m impedance injection modules in each leg instead of using a single leg and/or a single impedance injection module is to better facilitate the use of identical injection modules to satisfy multiple installation requirements in a much more efficient manner. In particular, the use of n legs allows the application of lower current capacity impedance injection modules to meet substantially any current requirements for all phases of high current transmission lines while not providing an excessive current capacity for lower current transmission lines. Similarly, the use of m injection modules for each leg allows the tailoring of the voltage injection capacity to the then present requirements, again without providing excessive capacity where such capacity is not needed. The foregoing provides an exemplary method for controlling power flow in a multi-phase power transmission system, wherein the impedance injection modules are installed in an m×n bank of impedance injection modules.

In the simplest case of AC injection onto a transmission line, a single injection module 10 may inject a pair of DC voltages to form a symmetric injection, with one pulse in each half cycle of the injection waveform. In this case, the fundamental frequency of the injected pair of positive and negative pulses will be asserted, with the remaining frequencies filtered out by the line reactance.

Figure 4:
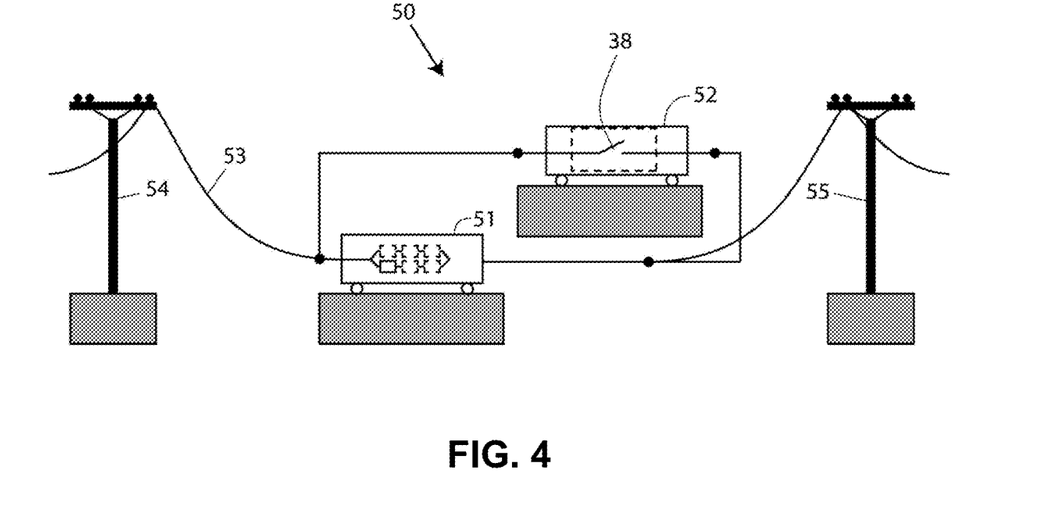
FIG. 4 is a schematic illustration of a power flow control system deployed in a mobile configuration, in accordance with the present invention.

FIG. 4 depicts an exemplary embodiment of a mobile power flow control system 50 of the present invention, provided on wheeled vehicles 51 and 52. In wheeled vehicle 51 (which may be provided in plurality and the TL-SSSC impedance injection modules therein and the impedance injection modules in multiple trailers connected in series and/or parallel), m=3 and n=2, where m represents the number of impedance injection modules in series, and n represents the number of parallel legs of the phase or line. System 50 is transportable over public and private roads to a convenient site for providing power control in transmission lines 53 of a power transmission system.

System 50 may be implemented as one or more mobile containers having the desired number of impedance injection modules set up inside, in addition to a bypass switch 38, according to a configuration determined by the support system 2, described in reference to FIG. 1, and coupled together, or configured to be coupled together for a particular installation site, as schematically illustrated in FIG. 3, for example. The mobile containers may have wheels as shown in FIG. 4, or may be transportable within wheeled vehicles. Accordingly, system 50 is a dispatchable power flow control system wherein all of the components can be assembled into a tested system prior to dispatch, and not broken down for transport. Transmission lines 53 may connect between tower support structures such as tower support 54 upstream of system 50, and tower support 55 downstream of system 50. Bypass switch 38 is described in reference to FIG. 3 and may be transported on a separate wheeled vehicle or trailer, or could be part of each mobile unit. Use of a separate wheeled vehicle has the advantage that a plurality of wheeled vehicles 51 may be used in series in each transmission line 53 (or one of the parallel legs "n" in a bank 35 of impedance injection modules, FIG. 3), yet only a single bypass switch need be used for the series combination of wheeled vehicles. In the case of multiple banks 35 of impedance injection modules 10 connected and operating in series, mobile or not, the synthesis of a power control waveform may be by way of cooperative control of multiple impedance injection modules 10 in multiple banks 35 of impedance injection modules 10.

Since the mobile flow control system 50 of FIG. 4 operates in a parked location on the ground, it requires isolation from ground, in contrast with the power flow control system 30a described in reference to FIG. 3. This isolation may be provided by post insulators, string insulators, or by other methods, typically elevating the high voltage elements adequately above the ground level to provide the required isolation. Such elevating devices and structures may be provided as part of the wheeled vehicles 51 and 52, by being provided by other wheeled vehicles and/or by way of preexisting, modified or erected structures for such use, with anything modified or erected for such use preferably being readily disassembleable for reconfiguring, or for transport and reassembly for redeployment at another location. In some embodiments, the wheeled vehicles 51 are truck trailers specifically built or modified for the intended purpose, and may incorporate the elevating mechanisms including associated insulating pedestals for supporting and insulating the TL-SSSC modules once deployed to their operating location. In some cases, it may be more practical to transport the TL-SSSC modules (and possibly other components) at an angle relative to the length of the respective wheeled vehicle differing from the needed or desired angular orientation of such devices when deployed for use, in which case the elevating mechanisms may be capable for elevating such devices and then turning them, or allowing them to be turned, to their angular orientation for use. Depending on the elevation required, it may be most convenient to elevate such devices to an intermediate elevation, rotate then to the angular orientation for use, interconnect them as required, and then elevate them further to their final elevation for use.

Where possible, various systems and subsystems to be deployed can be pre-configured in the trailers, and to the extent that on-site assembly and/or interconnection is necessary, all jumpers and other hardware may be prefabricated, labeled and provided in the respective wheeled vehicle transporting the devices on which the hardware will be used. Similarly, all jumpers, etc. needed to interconnect devices on multiple wheeled vehicles, if not pre-assembled, may at least be pre-fabricated to properly interconnect such devices (trailers) once the trailers are parked in the desired positions, which positions are also pre-laid out. Thus, the time to deploy is greatly reduced, as is the time of debugging and verifying the system once deployed. Also, since fewer errors can be anticipated if the systems are configured and installed at the factory, the cost of system debug and verification, once deployed, is reduced. Not only is the time to deploy reduced, but the overall cost to deploy is also greatly reduced by minimizing on-site labor requirements, and even on-site labor skill level requirement, as on-site labor costs are much greater than in-factory labor costs.

Figure 5:
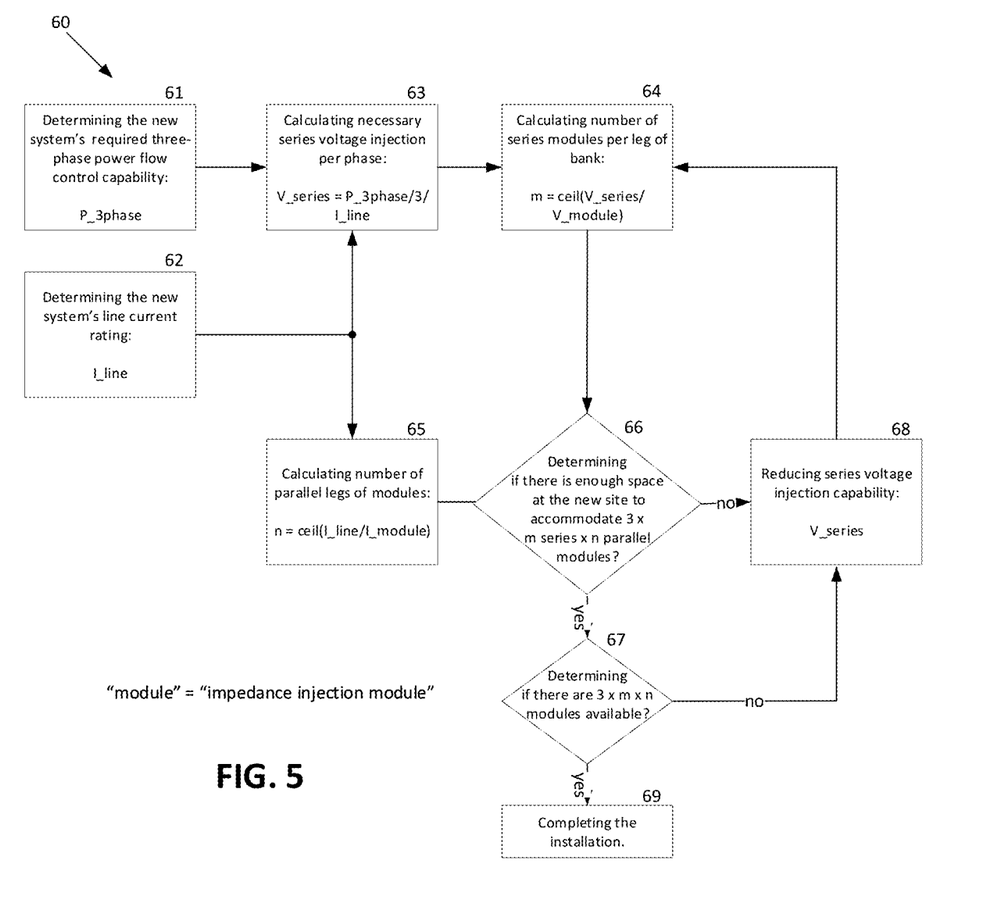
FIG. 5 is a flow chart that illustrates planning blocks for installing an agile power flow control system, in accordance with an embodiment of the present invention.

FIG. 5 is a flow chart 60 depicting a method for installing a modular power flow control system for optimizing power transmission on a three-phase transmission line, in an embodiment of the present invention. In this Figure and in the description thereof below, the word "module" means impedance injection module. The method includes: determining the new system's required three-phase power flow control capability, P_3phase, block 61; determining the new system's line current rating: I_line, block 62; calculating necessary series voltage injection per phase, V_series=P_3phase/3/I_line, block 63; calculating number of series modules per leg of bank, m=ceil(V_series/V_module), block 64; calculating the number of parallel legs of modules, n=ceil(I_line/I_module), block 65; determining if there is enough space at the new site to accommodate 3×m×n modules along with all necessary electrical and physical clearances, block 66; if the determination of block 66 is positive, determining if (3×m×n) modules are available, block 67; if the determination of blocks 66 or 67 are negative, reducing series voltage injection capability, V_series, block 68; and, if the determination of block 67 is positive, reconfiguring the transmission line to contain n parallel legs of m modules in series per phase, block 69. "ceil" represents the ceiling function, which maps to the least integer that is greater than or equal to the result of the division shown.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A modular power flow control system for use in a high voltage power transmission system comprising:
    a plurality of wheeled vehicles;
    a plurality of identical impedance injection modules, capable of being arranged in an m×n matrix in a phase of the high voltage power transmission system;
    the plurality of identical impedance injection modules being on and transportable by one or more of the plurality of wheeled vehicles over public and private roads;
    each impedance injection module having a transformerless static synchronous series converter therein;
    the impedance injection modules on each wheeled vehicle being at least partially connected together to form at least a part of the m×n matrix in the phase of the high voltage power transmission system;
    wherein m is the number of said impedance injection modules to be connected in series in each leg; and,
    wherein n is the number of legs collectively connectable in series with the phase of the high voltage power transmission system;
    whereby the modular power flow control system is deployable over public and private roads and connected into the phase of the high voltage transmission system in the m×n matrix in the phase of the high voltage power transmission system.

2. The modular power flow control system of claim 1 wherein at least one of the plurality of wheeled vehicles has or includes a bypass switch capable of being coupled in parallel with the impedance injection modules.

3. The modular power flow control system of claim 1 wherein the wheeled vehicles are trailers for towing to a site of deployment of the modular power flow control system.

4. The modular power flow control system of claim 1 wherein the identical impedance injection modules are wirelessly configurable and reconfigurable.

5. The modular power flow control system of claim 1 wherein each of the plurality of impedance injection modules contains a processor, a memory and a transceiver, wherein the memory contains instructions executable by the processor to configure or reconfigure the impedance injection module in which it resides responsive to software configuration programming.

6. The modular power flow control system of claim 5 wherein each of the plurality of impedance injection modules is reconfigurable responsive to software configuration programming, whereby each of the plurality of impedance injection modules is reconfigurable responsive to the software configuration programming changes to allow the impedance injection modules to collectively be remotely coordinated to execute different power flow control algorithms at different times.

7. The modular power flow control system of claim 1 wherein each of the plurality of impedance injection modules includes a full-bridge converter.

8. The modular power flow control system of claim 1 wherein each of the impedance injection modules will float at a line potential of a phase to which it is attached.

9. The modular power flow control system of claim 1 wherein each of the plurality of impedance injection modules provides an impedance injection level capability sufficient to optimize a reactive power transfer of at least 2 kVA per kilogram weight of the respective impedance injection module.

10. A modular power flow control system comprising:
    a plurality of identical impedance injection modules, arranged or configured to be arranged in an m×n matrix in each phase of a high voltage power transmission system;
    the plurality of identical impedance injection modules being disposed on one or more vehicles for transport over public roads for redeployment to a site for providing power control in the high voltage power transmission system;
    each impedance injection module having a transformerless static synchronous series converter therein, coupled in series with at least one other of the plurality of identical impedance injection modules, in a respective leg of the plurality of parallel legs collectively connected in series with a respective phase of the high voltage power transmission system;
    each impedance injection module in a leg of a plurality of parallel legs collectively connected in series with a respective phase of the high voltage power transmission system being configurable to inject a pre-determined power control waveform into the phase to which it is attached;
    wherein m is the number of said impedance injection modules connected in series forming each parallel leg; and,
    wherein n is the number of parallel legs collectively connected in series with a phase of the high voltage power transmission system.

11. The modular power flow control system of claim 10 wherein the identical impedance injection modules are wirelessly configurable and reconfigurable.

12. The modular power flow control system of claim 10 wherein m and n are integers, each in the range of 1-2,000.

13. The modular power flow control system of claim 10 wherein each of the plurality of impedance injection modules contains a processor, a memory and a transceiver, wherein the memory contains instructions executable by the processor to configure or reconfigure the impedance injection module in which it resides responsive to software configuration programming.

14. The modular power flow control system of claim 13 wherein each of the plurality of impedance injection modules is reconfigurable responsive to software configuration programming, whereby each of the plurality of impedance injection modules is reconfigurable responsive to the software configuration programming changes to allow the impedance injection modules to collectively be remotely coordinated to execute different power flow control algorithms at different times.

15. The modular power flow control system of claim 10 wherein each of the plurality of impedance injection modules includes a full-bridge converter.

16. The modular power flow control system of claim 15 wherein each full-bridge converter comprises four high-power switching elements in the form of an insulated gate bipolar transistor (IGBT), a thyristor, a metal oxide semiconductor field effect transistor (MOSFET), or a gate turn-off thyristor (GTO).

17. The modular power flow control system of claim 10 wherein each of the impedance injection modules floats at a line potential of the phase to which it is attached.

18. The modular power flow control system of claim 10 wherein each of the impedance injection modules is configurable to adjust line reactance while having a smaller effect on line resistance.

19. The modular power flow control system of claim 10 wherein each phase of a particular system configuration is matched to a corresponding particular system requirement by providing a number of legs n to ensure that current flowing in each impedance injection module does not exceed its recommended rating, and a number of impedance injection modules m in each leg to achieve a total impedance injection desired for the respective phase.

20. The modular power flow control system of claim 10 wherein each of the plurality of impedance injection modules provides an impedance injection level capability sufficient to optimize a reactive power transfer of at least 2 kVA per kilogram weight of the respective impedance injection module.

21. The modular power flow control system of claim 10 further comprising at least one bypass switch for bypassing the impedance injection modules in the n legs of the respective phase of the high voltage power transmission system; the at least one bypass switch being disposed on one or more vehicles for transport over public roads for redeployment to a site for providing power control in the high voltage power transmission system.

22. A modular power flow control system comprising:
a plurality of identical impedance injection modules, arranged in an m×n matrix in each phase of a high voltage power transmission system;
each impedance injection module having a transformer-less static synchronous series converter therein, coupled in series with at least one other of the plurality of identical impedance injection modules, in a respective leg of a plurality of parallel legs collectively connected in series with a respective phase of the high voltage power transmission system;
each impedance injection module in a leg of a plurality of parallel legs collectively connected in series with a phase of the high voltage power transmission system being configurable to inject a pre-determined power control waveform into the phase to which it is attached;
wherein m is the number of said impedance injection modules connected in series forming each parallel leg; and,
wherein n is the number of parallel legs collectively connected in series with the phase of the high voltage power transmission system.

23. The modular power flow control system of claim 22 wherein the identical impedance injection modules are wirelessly configurable and reconfigurable.

24. The modular power flow control system of claim 22 wherein m and n are integers, each in the range of 1-2,000.

25. The modular power flow control system of claim 22 wherein each of the plurality of impedance injection modules contains a processor, a memory and a transceiver, wherein the memory contains instructions executable by the processor to configure or reconfigure the impedance injection module in which it resides responsive to software configuration programming.

26. The modular power flow control system of claim 25 wherein each of the plurality of impedance injection modules is reconfigurable responsive to software configuration programming, whereby each of the plurality of impedance injection modules is reconfigurable responsive to the software configuration programming changes to allow the impedance injection modules to collectively be remotely coordinated to execute different power flow control algorithms at different times.

27. The modular power flow control system of claim 22 wherein each of the plurality of impedance injection modules includes a full-bridge converter.

28. The modular power flow control system of claim 27 wherein each full-bridge converter comprises four high-power switching elements in the form of an insulated gate bipolar transistor (IGBT), a thyristor, a metal oxide semiconductor field effect transistor (MOSFET), or a gate turn-off thyristor (GTO).

29. The modular power flow control system of claim 22 wherein each of the impedance injection modules floats at a line potential of the phase to which it is attached.

30. The modular power flow control system of claim 22 wherein each of the impedance injection modules is configurable to adjust line reactance while having a smaller effect on line resistance.

31. The modular power flow control system of claim 22 wherein each phase of a particular system configuration is matched to a corresponding particular system requirement by providing a number of legs n to ensure that current flowing in each impedance injection module does not exceed its recommended rating, and a number of impedance injection modules m in each leg to achieve a total impedance injection desired for the respective phase.

32. The modular power flow control system of claim 22 wherein each of the plurality of impedance injection modules provides an impedance injection level capability sufficient to optimize a reactive power transfer of at least 2 kVA per kilogram weight of the respective impedance injection module.

33. The modular power flow control system of claim 22 further comprising at least one bypass switch for bypassing the impedance injection modules in the n legs of the respective phase of the high voltage power transmission system.

\* \* \* \* \*